May 21, 1940. L. IMBLUM 2,201,178
VALVE REFACING TOOL
Filed Jan. 2, 1936 2 Sheets-Sheet 1
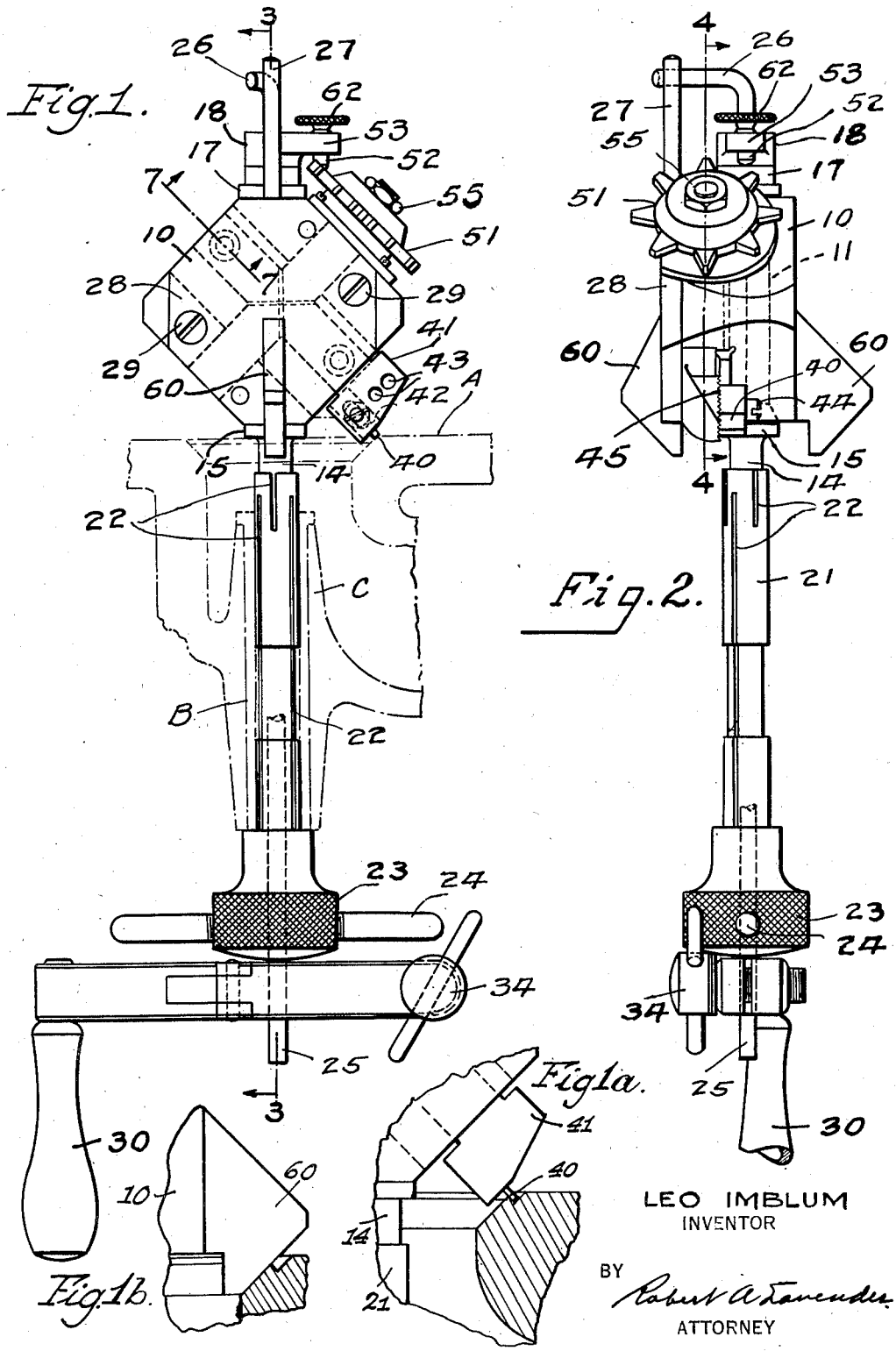
LEO IMBLUM
INVENTOR
BY Robert A. Lavender
ATTORNEY May 21, 1940. L. IMBLUM 2,201,178
VALVE REFACING TOOL
Filed Jan. 2, 1936 2 Sheets-Sheet 2
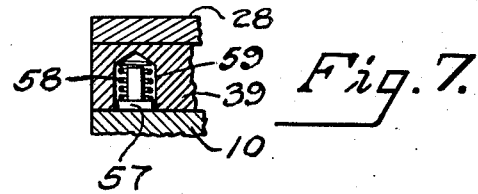
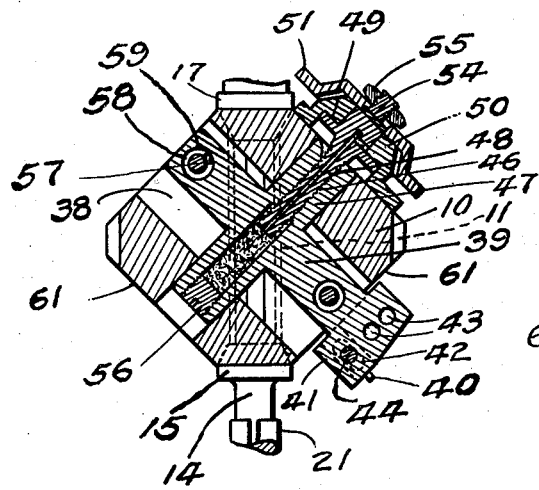
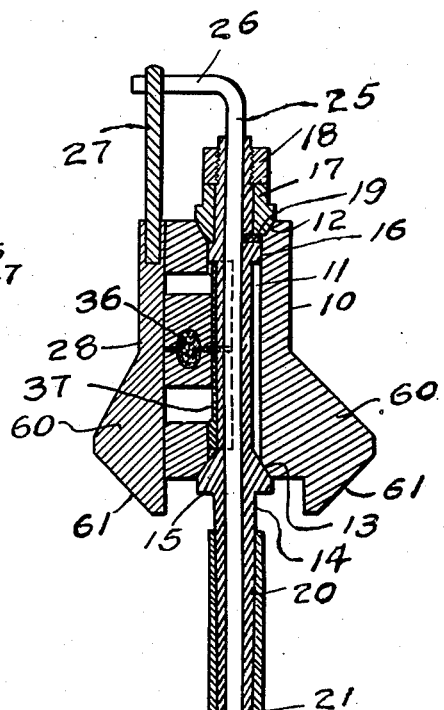
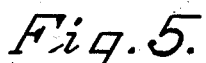
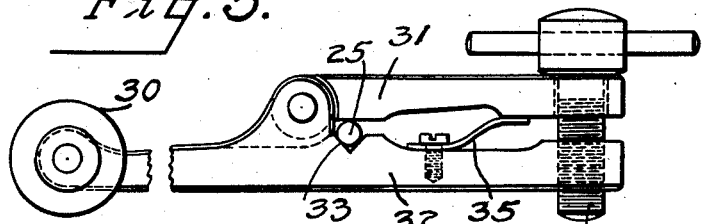
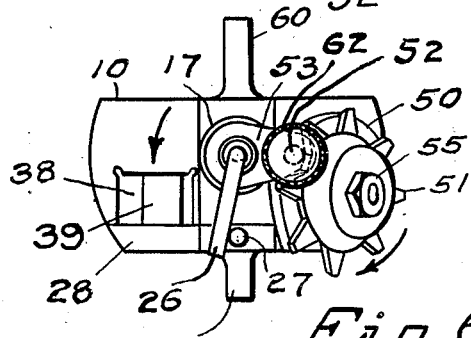
LEO IMBLUM
INVENTOR
BY 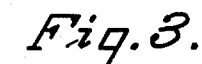
ATTORNEY Patented May 21, 1940

2,201,178

UNITED STATES PATENT OFFICE 2,201,178

VALVE REFACING TOOL

Leo Imblum, San Diego, Calif.

Application January 2, 1936, Serial No. 57,143

1 Claim. (Cl. 90—12.5)

(Granted under the act of March 3, 1883, as amended April 30, 1928; 370 O. G. 757)

This invention relates broadly to a valve refacing or reseating tool, and more particularly to a tool by means of which the valve seat is reseated positively concentric.

An object of the invention is to provide a valve seat refacing tool especially adapted to reface badly and eccentrically worn valve seats.

Another object of the invention is to provide a tool that is light and compact, and that centers itself in a worn but serviceable guide with the same accuracy as in one that is new and unworn.

A further object is to provide a tool of the character described that accurately performs the refacing of valve seats in a minimum of time.

In the drawings:

Fig. 1 is a front elevation of the valve seat refacing tool in position on a valve port of an internal combustion engine;

Fig. 1a is an enlarged view showing the position of the cutter while in operation;

Fig. 1b is an enlarged view showing the position of the rests while the valve seat is being refaced;

Fig. 2 is a side view of the tool;

Fig. 3 is a section on the line 3—3 of Fig 1;

Fig. 4 is a section on the line 4—4 of Fig. 2,

Fig. 5 is a bottom view of the actuating handle in Fig. 1;

Fig. 6 is a top view of Fig. 1; and

Fig. 7 is a section on the line 7—7 of Fig. 1.

Referring more particularly to Fig. 1 of the drawings, my valve seat refacing tool is shown in operative position on a valve port of an internal combustion engine A, in which port is mounted the usual valve stem guide bushing B with a guide C.

As may be seen more clearly in Fig. 3, the head 10 of the refacing tool is provided with a bore 11 terminating in beveled faces 12 and 13. An adjustable casing 14 passes through the bore and is provided intermediate its ends with a bearing 15 so constructed that it will seat itself in the lower beveled face 13 thereby centering the casing in the bore. In addition to the bearing 15 the casing is provided wih a collar or bearing flange 16 that fits snugly in the bore to serve as a further means to maintain accuracy in centering of the casing in the bore. Longitudinal adjustment of the casing is made through a cone member 17 seated in the upper beveled face 12 and resting against the bearing flange 16, the cone being held in position by a nut 18 on the upper end of the casing that is screw-threaded to accommodate the nut. A dowel pin 19 fastens together the cone member 17 and casing. The lower portion 20 of the casing is tapered and receives exteriorly an expanding sleeve 21 provided with longitudinal slots 22 (Fig. 2). The sleeve is tightened on the casing by a nut 23 provided with wings or finger pieces 24 (Fig. 1) that is in engagement with threads on the sleeve. When the tool is positioned for refacing a valve seat, the slots in the sleeve permit it to expand forming a tight fit between the encasing valve stem guide bushing B and sleeve.

The head 10 is driven or rotated about the casing by a drive rod 25 that passes through the casing and that is bent at substantially right angles at its upper end to form a crank arm 26 that engages with a vertical stud shaft 27 extending from a cover 28 for the head, the cover being secured to the head by any suitable fastening means 29. The drive rod is operated by a crank 30 (Fig. 1) that is secured to it by a clamp having a pivoted jaw 31 and a fixed jaw 32, in the inner surface of which there is a groove 33 for the reception of the drive rod. The jaws are held together by a screw 34 against the tension of a spring 35 that releases the pressure of the jaws on the rod when the screw is backed off. Although I have shown the crank attached to the lower end of the drive rod, it may be desirable for some types of engines to place it elsewhere on the rod, which may be done without in any manner destroying the maximum efficiency of the tool. 36 is an oil packing chamber for the drive rod and other associated parts, and 37 is a dust cover partially surrounding the casing to prevent foreign matter accumulating adjacent the outlet from the oil chamber to the rod.

Referring to Fig. 4, the head is provided also with a cross-shaped cutter-bar guideway 38 whose arms extend at approximately 45 degrees from the vertical axis of the tool when in operative position. A similarly shaped cutter-bar 39 is adjustably seated in the guideway 38. A cutter 40, preferably constructed from tungsten carbide, but other suitable material may be used, is carried by an enlarged arm 41 of the cutter-bar. Compensation for wear on or depth of cut adjustment of the cutter is permitted by a slot 42 in the cutter, and the cutter may be positioned at various locations along the length of the enlarged portion of the arm, as defined by openings 43, to accommodate valve seats of different diameters. The cutter is held in position by a screw 44, and is held against accidental slippage while in operation by serrations 45 in the meeting faces of the cutter and cutter-bar (Fig. 2).

The feed or adjustment mechanism to move the cutter along the width of the cut to be made is contained in an interiorly threaded bore 46 in the arm 47 of the cutter-bar. A feed screw 48, having a bearing flange 49, engages in the interior threads of the bore, and the bearing flange rotates in a bearing cap 50. The bearing cap in turn provides a bearing for a toothed wheel 51 that is actuated by a stud 52 mounted in an extension 53 of the nut 18. Each revolution of the head around the casing, a tooth of the wheel 51 comes into contact with the stud 52 causing the wheel to turn a short distance about its axis. As the wheel 51 is keyed to the feed screw 48 by key 54, the feed screw will be turned causing the cutter-bar to ride along the feed screw in a direction depending on the movement of the screw. The feed screw assembly is held in position by a lock nut 55. Moving parts of the feed mechanism for the cutter-bar are lubricated with oil placed in the lower portion of the threaded bore 46, that is closed by a removable plug 56.

As a means to dampen vibration and to prevent looseness in the cutter-box, a plurality of friction pins 57, under pressure of a spring 58, are placed in recesses 59 in the cutter-bar with their heads resting against the head 10, as may be seen more clearly in Fig. 7.

The head 10 and cover 28 are each provided with diametrically opposed fins 60 having bevelled edges 61 that act as guides to regulate the depth of the cut to be made in the valve seat. For example, if a cut .004 of an inch is to be made, the cutter is set so that it projects .004 of an inch beyond the bevel edges 61 that are seated in the valve seat, as shown in Fig. 1b. The operation of the tool is as follows: At the initial assembly of the tool, the cutter head is adjusted so that the bevel edges 61 rest against the valve seat and the lower portion of casing 20 is snug in expanding sleeve 21, these parts being seated together by light blows on the nut 23. If, in the initial assembly, the edges 61 are not quite touching the valve seat, turning of nut 23 draws in both casing 20 and sleeve 21 until the edges 61 just touch the valve seat as the cutter head is rotated. As stated, the cutter 40 is set at some predetermined distance beyond the face of the edges 61. As the head 10 is rotated, the toothed wheel 51 contacting with stud 52 causes the cutter 40 to traverse in its path, which is inclined to the casing at approximately a 45 degree angle, as shown, and first engage the outer edge of the valve seat, take a cut for one revolution, then move up an increment corresponding to a movement of the toothed wheel one notch, and so on until the whole face of the valve seat has been cut. The edges 61 continue to bear and rotate against the uncut portion of the valve seat and act as guides until the last of the seat has been cut. If the cutting has failed to clean up the valve seat, the cutter 40 can be run back to the starting point by turning the toothed wheel 51 by hand and drawing up nut 23 until the edges 61 are once more bearing against the valve seat, and the cutting operation repeated. The nut 23 also serves as a sleeve puller, in that when backing it off, the beveled faces 61 rest against the valve seat, and continued turning of the nut in the same direction will loosen the sleeve 21.

At times it may be desirable to turn the wheel 51 by hand, in which event the stud 52 may be withdrawn from the path of the teeth of the wheel by manipulation of the knurled nut 62 attached to the stud.

It will be understood that the above description and accompanying drawings comprehend only the general and preferred embodiment of this invention and that various changes in the construction, proportions, and arrangement of parts may be made within the scope of the appended claim, and without sacrificing any of the advantages of the invention.

This invention may be used and manufactured by or for the Government of the United States of America without the payment of any royalties thereon.

What is claimed is:

In a valve seat refacing tool adapted to be positioned within a valve port of an internal combustion engine, a casing secured in and extending through the valve port, a cutter head mounted on one end of the casing, crossed guideways in the cutter head arranged at approximately 45° to the longitudinal axis of the casing, a similarly shaped cutter bar operable within the guideways, a cutter tool adjustably mounted on one of the cross-arms of the cutter bar, a drive rod rotatably mounted within the casing and having its terminal adjacent the cutter head bent at an angle to the longitudinal axis of the rod, a member carried by the head engageable by the rod as it is rotated for imparting movement to the head, means mounted within one of said arms to impart movement to the cutter bar as the head is rotated, a star wheel mounted on the cutter bar actuating means, means carried by the casing for engaging the star wheel once each revolution of the head to intermittently actuate the star wheel, and means mounted on the rod at its terminal remote from the cutter head for imparting movement thereto.

LEO IMBLUM.